United States Patent [19]
Yamada et al.

[11] Patent Number: 4,598,989
[45] Date of Patent: Jul. 8, 1986

[54] CAMERA

[75] Inventors: Minoru Yamada; Eiji Ito; Masaru Nagai, all of Hachioji, Japan

[73] Assignee: Konishiroku Photo Industry Co. Ltd., Tokyo, Japan

[21] Appl. No.: 564,297

[22] Filed: Dec. 22, 1983

[30] Foreign Application Priority Data

| Dec. 23, 1982 [JP] | Japan | 57-225056 |
| Dec. 23, 1982 [JP] | Japan | 57-225057 |
| Dec. 23, 1982 [JP] | Japan | 57-225058 |
| Dec. 23, 1982 [JP] | Japan | 57-194059[U] |
| Dec. 23, 1982 [JP] | Japan | 57-194060[U] |

[51] Int. Cl.$^4$ ............................................. G03B 3/10
[52] U.S. Cl. ......................... 354/400; 354/195.1; 354/234.1; 354/271.1
[58] Field of Search .................... 354/400–403, 354/195.1, 234.1, 233, 230, 271.1; 350/255; 369/45; 355/55

[56] References Cited

U.S. PATENT DOCUMENTS

| 1,866,581 | 7/1932 | Simjian | 354/403 |
| 4,182,547 | 1/1980 | Siegmund | 350/255 X |
| 4,348,092 | 9/1982 | Hirohata et al. | 354/234.1 X |
| 4,419,614 | 12/1983 | Kimura | 350/255 X |
| 4,460,253 | 7/1984 | Kawai et al. | 354/271.1 |
| 4,482,986 | 11/1984 | Noda et al. | 350/255 X |

FOREIGN PATENT DOCUMENTS

| 1131093 | 10/1956 | France | 350/255 |
| 58-122506 | 7/1983 | Japan | 350/255 |

Primary Examiner—Michael L. Gellner
Attorney, Agent, or Firm—Jordan B. Bierman

[57] ABSTRACT

An automatic focusing camera comprising: a distance measuring means, a cylindrical permanent magnet means which is provided fixedly inside of the lens barrel, a cylindrical moving coil member which is concentric with said cylindrical permanent means, a lens unit which is driven together with the cylindrical moving coil member, and a spring for urging said lens unit to the most frequently employed focusing point of its travelling range, wherein the lens unit is adapted to move to a point corresponding to an output signal from the distance measuring means under the influence of the cylindrical moving coil member.

8 Claims, 4 Drawing Figures

CAMERA

BACKGROUND OF THE INVENTION

1. Field of the Invention

The present invention relates to a camera having a photographing lens-driving device operated by the electromagnetic force for focusing and a driving device operated by the electromagnetic force for the control of an exposure amount.

2. Description of the Prior Art

As a method for moving the lens unit for focusing operation and others, in the past, there have been a method wherein a motor is used as a driving source and a method wherein an electromagnetic force is used as a driving source. The former further includes a method wherein the photographing lens, like the one used in a lens-shutter camera, is energized with a spring to the position of infinity when the film is wound up after the completion of photographing and then the photographing lens is drawn out for photographing by the motor up to the position required by a measured-distance signal and a method wherein the amount of rotation of the motor and the direction of rotation are changed by the measured-distance signal, as seen in the AF device of a single lens reflex camera, thereby the photographing lens is moved, both of which require the addition of gear reduction device and of a device that converts the revolving motion to the rectilinear motion and therefore it is becoming hard to incorporate the former into the latest camera that is moving toward a trend of small size and light weight.

In the case of the latter, due to the electromagnetic method, it is possible to totally control with the amount and direction of the current sent to the moving coil member and thereby it is possible to reduce the number of steps for the movement of the photographing lens and thereby to simplify the control circuit and the control mechanism, but in the case of the conventional electromagnetic device, a fixed permanent magnet and a moving coil member are arranged so that they face each other in a plane therefore the device for converting the revolving motion of the moving coil member to the rectilinear movement is still needed, which restricts the miniaturization of a camera. Further, like the conventional motor-driven mode, there still is applied a method wherein the photographing lens moves from the position corresponding to the infinity to the position corresponding to the close distance and thereby the great driving force is required. However, it is impossible to make the effective length of the coil long enough due to the necessity to provide at the center portion of the moving coil member the space necessary for the optical system and therefore the driving force is weak and the function thereof is insufficient.

In the case of the camera having the conventional electromagnetic driving device, the holding frame for the permanent magnet and the lens holder for the photographing lens are separate each other regardless of whether the electromagnetic driving device is for shutter-driving or for photographing lens-driving. The reason for that is because it has been considered to be advantageous, when the operation efficiency and the yield rate etc. are considered, to separate into units by function. Practically, however, movable parts are limited to the parts in very small number such as a moving coil member and others and therefore the adjustment work in assembling is unnecessary and it is presently less necessary to take the trouble to constitute each mechanism with a separate parts by function. Rather, the recent camera that is small in size and is of high capability, dividing the mechanism by functions thereof has led to disadvantages that the mounting accuracy is deteriorated and narrowed internal spaces can not effectively be used. Like an electromagnetic driving shutter means, for example, when the design is made with an optical axis of the photographing lens as a standard, if the holder ring for the photographing lens and the electromagnetic driving shutter means are separated each other by functions, eccentricity for mounting and an error for positioning etc. thereof tend to be produced and thereby the holder ring can not be used as it is as a bearing for the moving coil member of the electro-magnetic driving shutter and there has been a problem that an excessive space is required there. Further, in the case of a conventional between-lens-shutter camera, a front lens holder ring and a rear lens holder ring are connected through the supports of the shutter means or the like. Consequently, the following disadvantages have existed. Firstly, the supports or the like are needed to be provided at the location where the complicated shutter time adjusting mechanism and others are avoided and thereby the efficient parts layout is retarded and unnatural layout has been compelled, secondly, in order to avoid the supports of aforesaid shutter device and others, unnecessary connecting parts have been required for the connection between the mechanisms which are directly connectable in the shutter time adjusting mechanism, and thirdly, the number of the connecting points between the shutter base plate supporting the front lens holder ring as well as the shutter and the rear lens holder ring is increased and thereby the optical center tends to be deviated thus many highly accurate positioning parts have been required.

Such disadvantages adversely affect not only on the mechanism layout but also on the accuracy and cost and especially for the recent camera whose internal space is considerably limited due to the miniaturization, the disadvantages have created serious problems.

The present invention is intended to solve various problems mentioned above.

SUMMARY OF THE INVENTION

The present invention is intended to solve aforesaid problems and it provides a camera having a lens barrel, a lens unit, and a lens-driving device: the lens-driving device comprises; a cylindrical permanent magnet means provided fixedly inside of said lens barrel, and a cylindrical moving coil member concentric with said cylindrical permanent magnet means and connected to said lens unit, said coil member moves rectilinearly in its axial direction when it is energized.

With aforesaid configuration, the effective length of the coil can be extremely long and thereby an object of the present invention is to provide a photographing lens-driving device that has a great electro-magnetic force and effectively utilizes a limited space owing to the rectilinear driving.

It is a further object of the present invention to provide a small-sized and light weight photographing lens-driving device that can enhance the driving force by disusing the inefficient and complicated driving system that converts a rotary motion to a rectilinear motion and by realizing the rectilinear driving with a direct electromagnetic force and can attain the purpose of focussing with a small driving amount by holding the lens unit at the middle point of its traveling range, and is excellent in an electricity-saving capability.

Moreover, this invention is intended to provide a photographing lens driving device, being able to be made compactly and have much driving force by giving up such an inefficient complicated driving method as converting the revolving motion to the rectilinear motion, saving much more electricity by reducing the travelling distance of the lens unit by means of keeping the lens unit at the middle of its travelling range and setting the aforesaid middle position at an ordinary focal point or at an over focal point, and minimizing the bad effect to the photographing even if a moving coil member is not charged with electricity because of an unexpected electric accident.

Furthermore, this invention is intended to provide a camera having a precise electromagnetic driving device, which uses the room inside the camera effectively and made the optical axis coincide with the fixing position of the fixed permanent magnets by such an easy way to make a holding frame of the fixed permanent magnets, used for the electromagnetic driving device, and the photographing lens holder ring together in one body.

Additionally, this invention is intended to provide an optical linking device for the between shutter, which enables not only precise location, using small space effectively, but also mechanical simplifying by the reduction of the freedom of locating the supports of the shutter means or by the reduction of the number of parts of shutter time control mechanism, by means of linking the front lens holder ring with the rear lens holder ring, making use of the magnetic power of the fixed permanent magnets used for the electromagnetic driving shutter means.

DETAILED DESCRIPTION OF THE INVENTION

Figure 1:
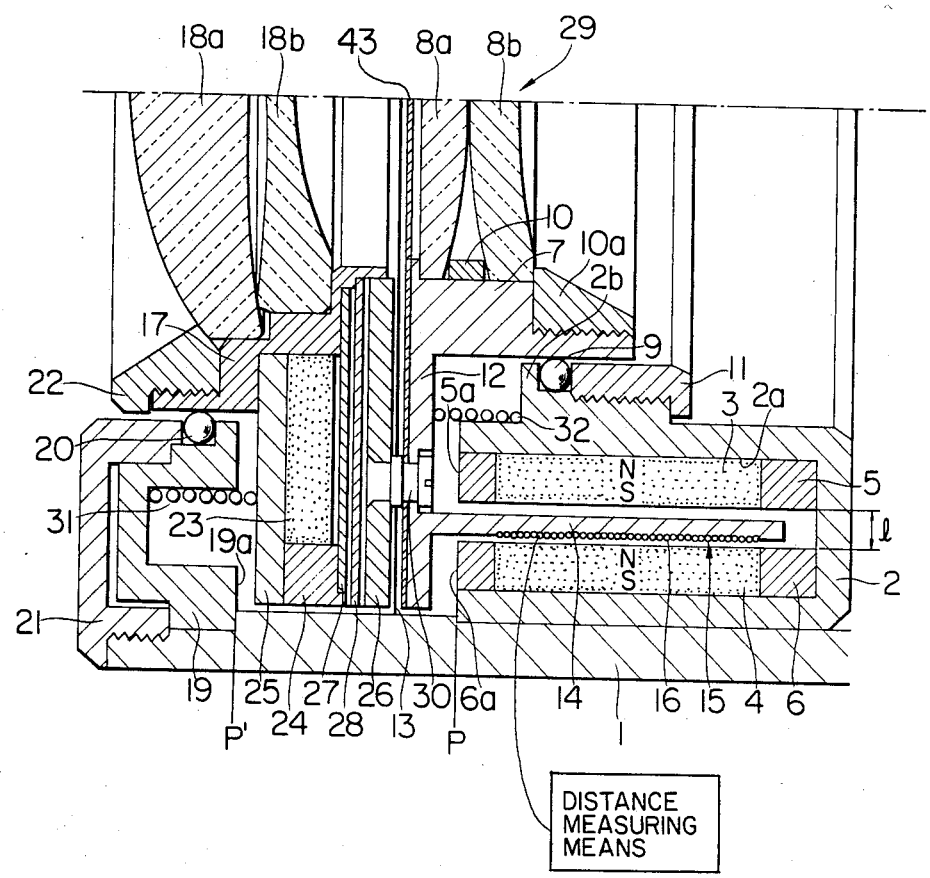
FIG. 1 is a sectional plan of the important part in the optical axis of the photographing lens focusing driving device of a camera.

In the next place, this invention is described according to the example shown in the appended drawings.

The numeral 1 is a lens barrel, and in the inner face of the fundamental part of the aforesaid lens barrel 1, a cylindrical yoke, equipped with a groove 2a, is fixed.

The numerals 3 and 4 are fixed permanent magnets fixed cylindrically by the inner and outer holding cylinders 5, 6, which are loosely fitted in the groove 2a of the said cylindrical yoke, keeping a constant clearance 1.

And of course, the aforesaid fixed permanent magnets 3, 4 themselves may be cylinders, which are not illustrated.

The poles of the facing surfaces of these fixed permanent magnets 3, 4, facing inside to outside, need to be different from each other. The numeral 7 is a holder ring of rear lenses 8a, 8b, and the said holder ring is supported movably by the ball bearings 9 in the frange, which is equipped in the abovementioned cylindrical yoke. The numeral 10 is a spacer keeping the distance between the said rear lenses 8a, 8b, and 10a is a holder of the rear lenses 8a, 8b, and 11 is a holder preventing the said ball bearings 9 from falling out. 12 is a supporting plate of the shutter 13, and the supporting plate 12 is equipped together with the said holder ring 7. 14 is a cylinder projected from the rear face of the supporting plate, and fits in with the clearance 1 between the said inner and outer fixed permanent magnets 3, 4. 15 is a cylindrical moving coil member comprising the said cylinder 14 and a coil 16 wound around the cylinder 14, and the cylindrical moving coil member moves rectilinearly in the axial direction by the electromagnetic power when the coil 16 is charged with electricity. 17 is a holder ring of the front lenses 18a, 18b, and the holder ring 17 is supported movably by the ball bearing 20 in the cylindrical frame 19, which is fixed on the inner surface of the top of the said lens barrel. 21 is a fore frame combining a stopper preventing the said ball bearing 20 from falling out, and 22 is a holder of the front lenses 18a, 18b. 23 is a fixed permanent magnet to drive electrically the said shutter 13, and the said fixed permanent magnet 23 is supported by the holding frame 24, which is together in one body with the front lens holder ring 17. 25 is the yoke magnetized to the front face of the said fixed permanent magnet, which is to drive the said shutter. 26 is the yoke fixed in rear of the said fixed permanent magnet 23, keeping a certain gap. In the gap between this fixed permanent magnet 23 and the yoke 26, plural disk-shaped moving coil members 27, 28 are equipped. And one of the disk-shaped moving coil members 27, 28 is to drive the shutter, and the other is to control it. 29 is a lens unit composed by the link of the said rear lens holder ring 7 and the front lens holder ring 17 by means of linking member 30, and the said lens unit 29 is driven back and forth, accompanied with the said cylindrical moving coil moving rectilinearly in the axial direction by the electromagnetic force. The travelling range of this lens unit 29 is restricted between P-P', where rear point P is the inner face 5a, 6a of the holding cylinders 5, 6, which are holding the fixed permanent magnets 3, 4, and front point P' is the inner surface 19a of the cylindrical frame 19 fixed on the inner surface of the top of the lens barrel 1. 31 is a spring which pushes the said lens unit 29 rearward, 32 is a spring which pushes the said lens unit 29 forward, and the spring forces of the two springs 31, 32 balance so that the lens unit 29 is kept at the middle position of its travelling range P-P' when the said cylindrical moving coil is not charged with electricity.

In the next place, the operation of the camera on which the photographing lens driving device by this invention is mounted is explained.

At first, the camera is kept to face an object and the release button is pushed, then it is judged whether the subject distance optical focusing point of the lens unit 29 is at the most frequently employed focusing point, or nearer or further than it, by the distance measuring circuit and so on. And if it is nearer, the coil 16 is charged with electricity and the cylindrical moving coil member 15 is moved forward, so that the lens unit 29 proceeds forward against the spring 31 and the yoke 25, which composes the front end of the lens unit 29, is stopped by touching the inner surface 19a of the cylindrical frame 19, that is, the front point P'. On the contrary, if it is further, the cylindrical moving coil part 15 moves backward, the lens unit 29 moves backward against the spring 32, and the shutter supporting plate 12, which composes the rear end of the lens unit 29, is stopped to touch the inner surface 5a, 6a of the cylindrical yoke 5, 6, that is, the rear point P. This lens unit 29 is moved forward or backward by changing the direction of the electric current of the cylindrical movable coil member 15. And, of course, the direction of the electric current is decided by the poles of the fixed permanent magnet 3, 4, which are arranged cylindrically.

Moreover, if the optical focusing point is at the most frequently employed focusing point, the springs 31, 32 are kept balancing at the initial position, so that the cylindrical moving coil member 15 is not charged with electricity by the CPU control mechanism (not illustrated).

As mentioned above, once the lens unit 29 operates and the focusing point is decided, successively the exposure signal is sent by the exposure amount control circuit (not illustrated), the disc-shaped coil members 27, 28 are charged with electricity, and the shutter 13 operates with a certain aperture value and time control.

After the exposure amount control is completed, the electric current to the cylindrical moving coil member 15 is cut off, and the lens unit 29 is returned to the neutral point by the spring 31 or 32, and then they wait for next photographing.

In this way, according to this invention, because the cylindrically arranged fixed permanent magnets, the cylindrical moving coil member, which loosely fits with the said fixed permanent magnets, and the lens unit, which is driven together with the said cylindrical moving coil part, are equipped, the device to drive the lens unit back and forth for the purpose of focusing operation is very simple, and can be easily made compact because of needlessness of some special control mechanism, and can be put in the lens barrel.

Additionally, because it is composed of the combination of the cylindrically arranged fixed permanent magnets and the cylindrical moving coil member, the effective length of the coil is enlarged more greatly than the conventional electromagnetic driving device, so that there are some superior effects, like that the driving force is much greater and the effective rate is larger by the same amount of electricity in the same magnetic field.

Moreover, because, in this invention, the springs are equipped to keep the lens unit at the middle position of the travelling range when the cylindrical moving coil part is not charged with electricity, it is sufficient for the lens unit to move back and forth from the middle point as a initial position, so that the focusing operation from the infinite distance to the nearest distance can be performed by the least travelling distance, and in addition to the high effect of saving electricity the time after operating the release button up to completing focusing can be shortened, and some more superior effects are there.

Furthermore, because, according to this invention, the most frequently employed focusing point is set at the middle point of the range where the lens unit is held by the spring, in the usual photographing, not only the electricity can be greatly saved because of little necessity to charge the cylindrical moving coil member with electricity, but also the bad effect for photographing can be minimized when the cylindrical movable coil part cannot be charged with electricity by some electric accident, and some more superior effects are there.

In addition, linking the front lens holder ring with the rear lens holder ring by the attractive force of the fixed permanent magnet, which is used for the electromagnetic driving shutter means, being different from the conventional one linking by the supports of the shutter means, this invention enables not only to locate parts efficiently in a narrow room but also to simplify the shutter time control mechanism. And it enables to save the connecting points by linking members among the front lens holder ring, the fundamental shutter plate, and the rear lens holder ring, so that it is very easy to adjust the optical center and a precise electromagnetic driving shutter means can be provided, and some more superior effects are there.

Figure 2:
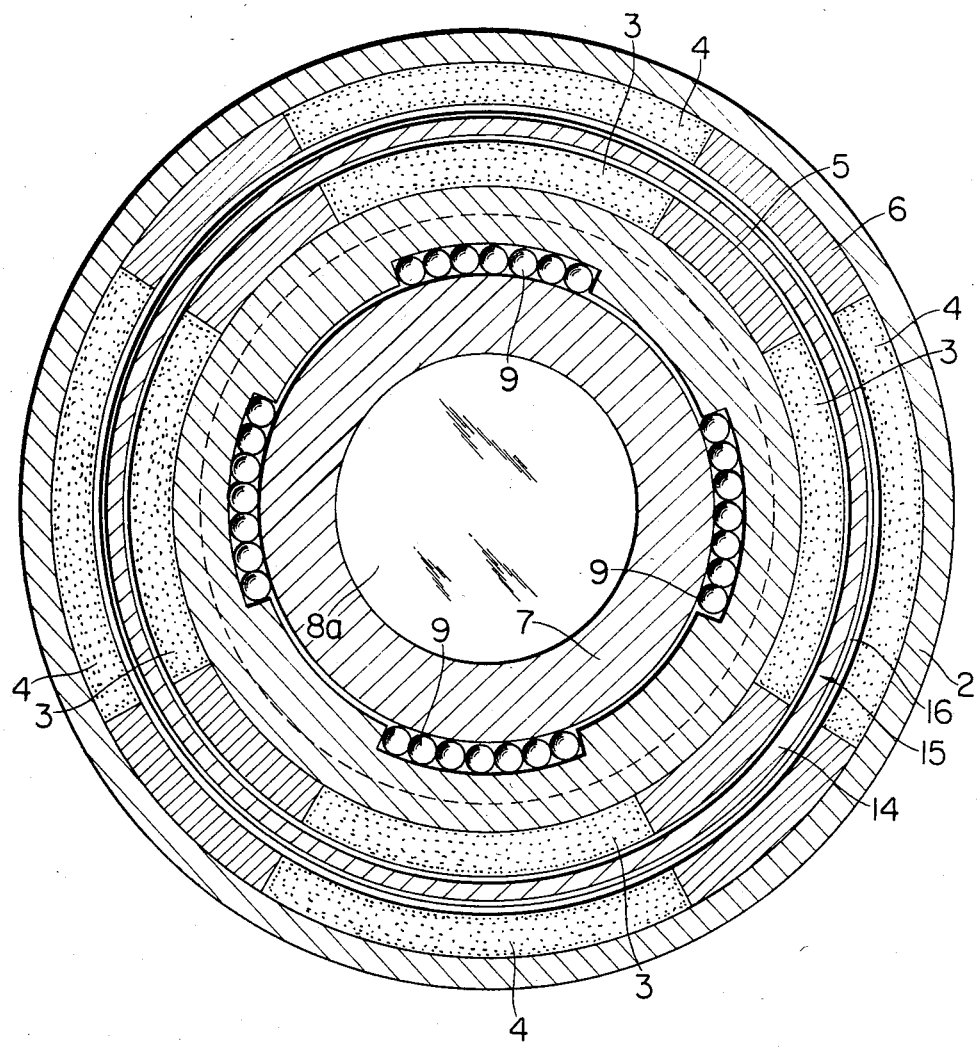
FIG. 2 is a sectional plan of the important part in the direction being at right angles to the optical axis of the aforesaid driving device.
Figure 3:
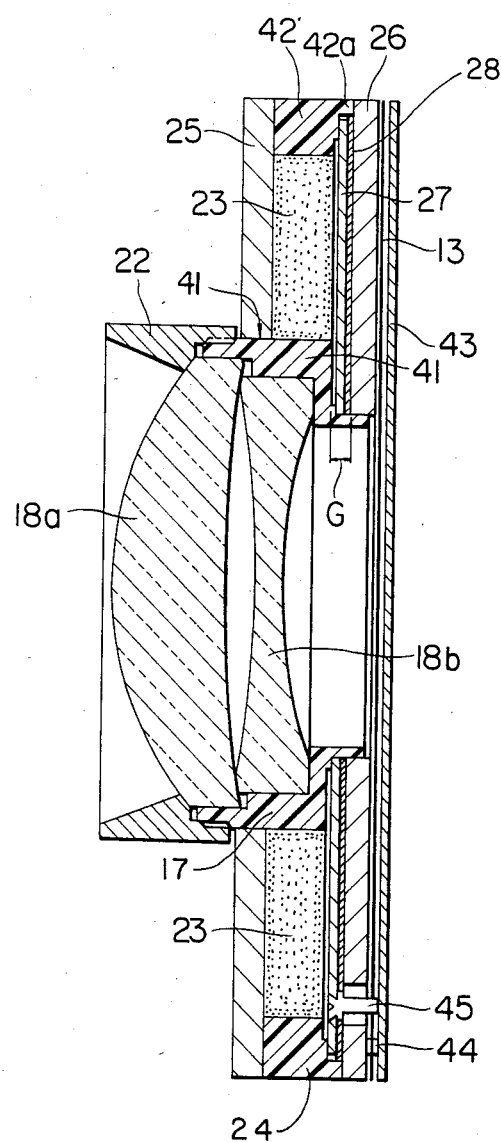
FIG. 3 is a sectional side view of the important part of the electromagnetic driving device for the exposure amount control of a camera.
Figure 4:
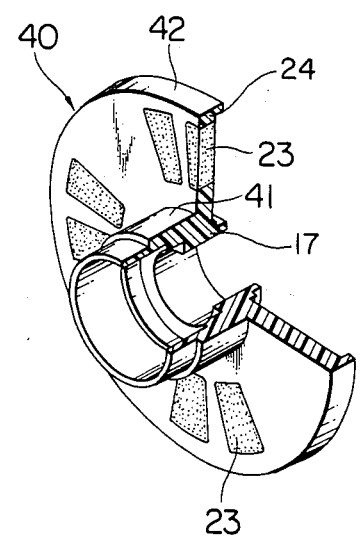
FIG. 4 is a partially sectional cross-eyed view of the all-together body of the aforesaid driving device.

In the next place, this invention is explained according to the example shown in FIG. 3. All the same symbols are used where the structure is the same as FIG. 1 and FIG. 2.

The numeral 40 is a formed part made of some kind of nonmagnetic material like plastics, being shaped in one body, including the central cylinder 41 and the flange 42 together, and the central cylinder of the formation 40 composes a holder ring 17 fitted in with the photographing front lenses 18a, 18b, and the flange 42 composes a holding frame 24 of permanent magnets where fixed permanent magnets 23 is buried at the same distance along the circumference. The said photographing front lenses 18a, 18b are fixed by the front frame, which is screwed in the front circumference of the central cylinder 41, which is the holder 22 at the same time. 25 is the first yoke fitted in with the front circumference of the said central cylinder 41, and the first yoke is fixed magnetically in front of the said flange 42 by the attractive force of the fixed permanent magnet 23. 26 is the second yoke fitted in with the rear circumference of the said central cylinder 41, and the second yoke 26 is fixed on the circular projection 42a arranged on the rear circumferance of the said flange 42 by the attractive force of the fixed permanent magnet 23, keeping a certain gap from the said fixed permanent magnet 23. 27 is a moving coil member equipped in the gap G between the fixed permanent magnet 23 and the second yoke 26, being able to rotate in the axis of the circumference of the central cylinder 41 of the said formation 40. This moving coil member 27 rotates rightward or leftward according to the direction of the electric current, with which the unillustrated coil is charged. 13 is the aperture shutter blade, and the aperture shutter blade 13 is supported by the axis 44 between the second yoke 26 and the holder 43 which is fixed at a certain distance from the second yoke 26 by screws and so on (not illustrated), fitting with the pin 45 planted on said moving coil member, opening and closing in accompany with the rotation of the moving coil member 27.

According to this invention, because the holding frame of the fixed permanent magnet 23 and the photographing lens holder ring are formed together by nonmagnetic material, if it is applied for the electromagnetic driving shutter means as mentioned above, the optical axis and the center of the shutter coincide precisely without any adjustment so that it can be expected to rise the working efficiency of assembling, and because the circumference of the holder ring can be made direct use of as a bearing of the moving coil member, not only the reduction of the number of parts, but also it can be fixed without any trouble even if the inner space is as narrow as a compact camera, and the total cost of manufacturing a camera can be reduced a lot, and some other superior effects are there.

Additionally, because this invention is composed as mentioned above, it can be applied for not only the focusing operation of photographing lens but also the barrel sinking device or zooming, if it is the device being able to move rectilinearly. And though, in the above example, the lens unit is formed together in a body with the rear lens holder ring and the front lens holder ring, it may be formed with only one of the two, of course.

What is claimed is:

1. An automatic focusing camera comprising: a distance measuring means, a photographic lens-driving device having a cylindrical permanent magnet means which is provided fixedly inside of a lens barrel and a cylindrical moving coil member which is concentric with said cylindrical permanent means, a lens unit which is driven together with said cylindrical moving coil member, and a spring means for urging said lens unit to the most frequently employed focusing point of its traveling range, wherein said lens unit is adapted to move to a point corresponding to an output signal from said distance measuring means under the influence of said cylindrical moving coil member.

2. The camera according to claim 1 wherein said cylindrical permanet magnet means comprises two cylindrical permanet magnets fixed by inner and outer holding cylinders so that opposite poles face each other, said cylindrical moving coil member fitting loosely between said fixed permanent magnets in the lens-driving device.

3. A camera according to claim 2, wherein the most frequently employed focusing point is provided at the middle point of the traveling range of the lens unit.

4. The camera according to claim 1 wherein aforesaid lens unit comprises a photographing lens, a lens holder ring holding said photographing lens and an electro-magnetic driving device containing disc-shaped coil members for controlling the exposure amount.

5. The camera according to claim 4 wherein said electro-magnetic driving device comprises fixed permanent magnets, a holding frame for holding said permanent magnets, and yokes that engage with said permanent magnets of said electro-magnetic driving device, said yokes linked to the photographic lens-driving device.

6. The camera according to claim 5 wherein the electro-magnetic driving device is characterized in that a holding frame for fixed permanent magnets to be used for aforesaid electro-magnetic driving device and said photographing lens holder ring are formed in one body and made of non-magnetic material.

7. The camera according to claim 5 wherein the camera is a between-lens-shutter camera characterized in that aforesaid photographing lens holder ring comprises a front group lens holder ring and a rear group lens holder ring and an electro-magnetic driving device is provided between them.

8. The camera according to claim 7 comprising a connecting means wherein the front group lens holder ring and the rear group lens holder ring are connected by means of a linking member that engages with the yokes retained by the attracting force of the fixed permanent magnets used in the electro-magnetic driving device.

* * * * *